(12) United States Patent
Friedberger et al.

(10) Patent No.: US 12,510,435 B2
(45) Date of Patent: Dec. 30, 2025

(54) FLUID TRANSPORT DEVICE AND METHOD FOR MANUFACTURING A FLUID TRANSPORT DEVICE

(71) Applicants: AIRBUS SAS, Blagnac (FR); Airbus Operations GmbH, Hamburg (DE); University of Ioannina-Special Account for Research Funds, Ioannina (GR)

(72) Inventors: Alois Friedberger, Hamburg (DE); Dariusz Krakowski, Hamburg (DE); Alkiviadis S. Paipetis, Ioannina (GR); George Karalis, Ioannina (GR)

(73) Assignees: AIRBUS SAS, Blagnac (FR); Airbus Operations GmbH, Hamburg (DE); University of Ioannina-Special Account for Research Funds, Ioannina (GR)

( * ) Notice: Subject to any disclaimer, the term of this patent is extended or adjusted under 35 U.S.C. 154(b) by 310 days.

(21) Appl. No.: 18/144,479

(22) Filed: May 8, 2023

(65) Prior Publication Data

US 2023/0366771 A1    Nov. 16, 2023

(30) Foreign Application Priority Data

May 10, 2022    (EP) .................................... 22386026

(51) Int. Cl.
  *G01M 3/40*    (2006.01)
  *H01L 35/30*    (2006.01)
  *H10N 10/01*    (2023.01)

(52) U.S. Cl.
  CPC .............. *G01M 3/40* (2013.01); *H10N 10/01* (2023.02)

(58) Field of Classification Search
  CPC ........... G01M 3/00; G01M 3/40; H01L 35/00; H01L 35/28; H01L 35/30; H10N 10/01
  See application file for complete search history.

(56) References Cited

U.S. PATENT DOCUMENTS

2008/0066796 A1\*   3/2008   Mitchell ................ B64D 41/00
                                                                136/205
2009/0235670 A1   9/2009   Rostek et al.
                        (Continued)

FOREIGN PATENT DOCUMENTS

CN          105221854 B     6/2017
EP          3579287 A1     12/2019
                        (Continued)

OTHER PUBLICATIONS

Extended European Search Report including Written Opinion for Application No. 22386026.3 dated Oct. 20, 2022, pp. 1-7.

*Primary Examiner* — Nguyen Q. Ha
(74) *Attorney, Agent, or Firm* — Lerner David LLP

(57) ABSTRACT

A fluid transport device includes a conduit unit having a wall for separating an inside from an outside of the conduit unit. The device also includes an energy supply unit coupled to the conduit unit and configured to provide electrical energy based on a temperature gradient between the inside and the outside of the conduit unit. The device also includes a monitoring unit configured to monitor a state of the conduit unit and to generate data representative for the state of the conduit unit. The energy supply unit supplies the electrical energy to the monitoring unit, thereby enabling the monitoring unit to monitor the state of the conduit unit. A method for manufacturing a fluid transport device is also described.

12 Claims, 3 Drawing Sheets

(56) References Cited

U.S. PATENT DOCUMENTS

| | | |
|---|---|---|
| 2011/0131999 A1 | 6/2011 | Gao et al. |
| 2013/0327127 A1 | 12/2013 | Osthus et al. |
| 2016/0172570 A1* | 6/2016 | Wright ................. H10N 10/853 |
| | | 136/238 |
| 2022/0109094 A1* | 4/2022 | Liang ..................... F25B 21/02 |

FOREIGN PATENT DOCUMENTS

| | | |
|---|---|---|
| EP | 3637483 A1 | 4/2020 |
| FR | 2947529 A1 | 1/2011 |
| FR | 3030726 A1 | 6/2016 |
| GB | 2483369 A | 3/2012 |
| WO | 2016090087 A1 | 6/2016 |

* cited by examiner

FLUID TRANSPORT DEVICE AND METHOD FOR MANUFACTURING A FLUID TRANSPORT DEVICE

FIELD OF THE INVENTION

The invention relates to the monitoring of distribution systems for fluid media. In particular, the invention relates to a fluid transport device and method for manufacturing a fluid transport device.

BACKGROUND OF THE INVENTION

Transportation and distribution systems for fluid media usually include several conduit units which are adapted to transport a respective fluid medium to a target location. These conduit units may be present in the form of pipes through which the fluid can be transported. Based on the specific application, such fluid transportation and distribution systems may be very complex. For example, an air distribution system of a vehicle, such as a ground vehicle or an aircraft may include a multiplicity of branches and tapping points where the air should have specified properties. Due to this complexity, it is difficult to thoroughly monitor the entire fluid transportation and distribution system. However, it should be envisaged to monitor as much of the system as possible in order to be able to recognize abnormal system behaviors or critical system conditions at an early stage, such that counter measures can be initiated in due time.

US 2013/0 327 127 A1 describes a leakage detection device comprising a cuff of an elastic material for being circumferentially wrapped around a region of a fluid-carrying conduit, wherein the cuff has an inner surface and an outer surface, through which at least one opening extends. At least one holder that comprises at least one guide element for guiding a measuring element over the opening is arranged at the edge of the opening. In this way, the measuring element can be positioned at a predetermined radial distance from the opening.

US 2009/0 235 670 A1 describes a bleed air supply system and a safety device for closing a valve in at least one of the several bleed air supply lines depending on an alarm signal that indicates an opening in at least one of the several bleed air supply lines.

BRIEF SUMMARY OF THE INVENTION

It may be seen as an aspect of the invention to facilitate the monitoring of a fluid transport system.

According to an aspect of the invention, a fluid transport device is provided. The fluid transport device comprises a conduit unit, for example a pipe section or tube-like structure, having a wall for separating an inside of the conduit unit from an outside of the conduit unit, wherein the conduit unit is configured to transport a fluid, e.g., a gas or a liquid, through the inside of the conduit unit. The fluid transport device further comprises an energy supply unit coupled to the conduit unit, wherein the energy supply unit is configured to provide electrical energy based on a temperature gradient between the inside of the conduit unit and the outside of the conduit unit. The fluid transport device further comprises a monitoring unit configured to monitor a state or a condition of the conduit unit, wherein the monitoring unit is configured to generate data representative for the state or condition of the conduit unit. The energy supply unit is configured to supply the electrical energy to the monitoring unit, thereby enabling the monitoring unit to monitor the state or condition of the conduit unit.

The inventive fluid transport device provides a self-contained monitoring system for monitoring the state or condition of the conduit unit. In particular, the fluid transport device can monitor the state or condition of the conduit unit and can furthermore provide the required electrical energy by the integrated energy supply unit to enable operation of the monitoring unit. The monitoring unit and the energy supply unit can be integrated into the fluid transport device during the manufacturing of the fluid transport device such that no additional installation effort is required after the fluid transport device was installed into a platform system like a fluid distribution system.

In this manner, the additional installation of sensors and the corresponding cabling after the pipe or conduit system has already been installed can be avoided, thereby significantly reducing the installation effort. In other words, the inventive fluid transport device has self-sensing properties and is thus multifunctional in that it transports the fluid, generates electrical energy locally where it is needed, and monitors the state or condition of the conduit unit. The monitoring of the state or condition may include the detection of cracks, overload, air leaks, oil and lubricant debris, and other air contaminations at the conduit unit.

The conduit unit may comprise a pipe or tube-like structure. The conduit unit may thus be present in the form of a tube with a circular cross-section. However, other shapes of cross-sections for the conduit unit are possible. The wall of the conduit unit has a certain thickness which depends on the specific application of the fluid transport device. The conduit unit is configured to transport or guide the fluid therethrough, e.g., through the inside of the conduit unit. In particular, gases or liquids at any temperature range can be transported through the conduit unit.

The energy supply unit may include or represent a thermoelectric generator which generates electrical energy based on a temperature difference or a temperature gradient between the inside and the outside of the conduit unit. The temperature gradient may be present over the thickness of the wall of the conduit unit. For example, if warm fluid is transported through the inside of the conduit and the temperature on the outside of the conduit unit is lower than on the inside of the conduit unit, a temperature gradient will occur in the wall of the conduit unit that can be used by the energy supply unit, e.g., the thermoelectric generator, to generate an electric current and therefore electrical energy.

The energy supply unit may be attached to the wall, for example on an outer surface of the wall of the conduit unit. Alternatively, the energy supply unit may be integrated into the wall of the conduit unit. After electrical energy generation by the energy supply unit, the electrical energy may be transferred to the monitoring unit, which monitoring unit may be electrically coupled to the energy supply unit. The monitoring unit can also be attached to the outer surface of the wall or can be at least partially integrated into the wall. For example, an electronic patch on the outer side or surface of the conduit unit may collect electric power and also sensor signals and then provides data via a wireless transmission as will be explained in more detail below.

The monitored state or condition of the conduit unit may represent a condition at, around or inside of the conduit unit. For example, leaks in the conduit unit can be detected by the monitoring unit if the temperature around the conduit unit abnormally increases. As a further example, detections inside the conduit unit may be conducted by the monitoring unit using sensors that extend to the inside of the conduit unit. This allows the monitoring of pressure, temperature, flow rate, pH-value, etc., of the fluid The overall concept of the inventive integration allows a considerable reduction of wires and harness that has to be employed for energy supply and monitoring functions at a fluid distribution system since all functions may be combined in a single entity. The fluid transport device thus provides a reduced installation effort for safety related monitoring, a maintenance on demand based on sensor information, and also an immediate warning in case of cracks, overload, leaks based on the monitored state of the conduit unit. Different kinds of relevant parameters in the transported fluid (liquid or gas) in the tubes can be monitored, e.g., temperature, pressure, air leaks, oil and lubricant debris and other air contaminations, independent of an energy supply based on cables. All these parameters can be detected by the monitoring unit and then be transmitted as the corresponding data which are representative for the state of the conduit unit. The monitoring unit therefore may include one or more sensors which are configured to obtain these parameters.

Electronics may be provided to store and convert the electrical energy generated by the energy supply unit and to power the sensors, to acquire the data and to provide the data transfer. The electronics can be placed on a printed circuit board (PCB). However, they can also be miniaturized, e.g., on a foil-based flexible PCB and integrated on the wall of the conduit unit following the curvature of the wall. The sensors can be connected to the electronics, and they can also be integrated on the electronic board.

According to an embodiment, the fluid transport device further comprises a data transmission unit configured to transmit the data generated by the monitoring unit to an external device.

The data transmission unit may transmit the data about the state or condition of the conduit unit obtained by the monitoring unit to the external device via a wired or wireless transmission. A wireless transmission is advantageous since, in this manner, the inventive fluid transport device can be manufactured and installed completely independent of any other component of a fluid distribution system. No cablings are required and the fluid transport device which includes the energy supply unit, the monitoring unit and the data transmission unit can be used as a modular, self-contained entity which can be installed anywhere in the fluid distribution system. Therefore, the fluid transport device can be said to be an autonomous multifunctional structure with the functions fluid transport, power generation, monitoring and wireless data transfer. The external device may be a processing device or the like which is configured to collect, store and/or process the received data.

According to an embodiment, the energy supply unit comprises at least one thermoelectric generator which is positioned on the wall of the conduit unit or is at least partially integrated into the wall of the conduit unit, wherein the at least one thermoelectric generator generates the electrical energy based on the temperature gradient between the inside of the conduit unit and the outside of the conduit unit.

As explained above, the temperature gradient or difference can exist between an inner surface of the wall and an outer surface of the wall of the conduit unit. This temperature gradient or difference depends on a temperature of the medium surrounding the wall of the conduit unit and the medium, i.e., the fluid, which moves through the conduit unit.

The thermoelectric generator may be a solid-state device that is configured to convert heat flux (temperature differences) directly into electrical energy. Therefore, the thermoelectric generator uses the so-called Seebeck effect. The thermoelectric generator, for example thermoelements thereof, may be placed on the outer surface of the wall. However, it is possible that parts of the thermoelectric generator, e.g., the thermoelements are integrated into the wall structure of the wall of the conduit unit.

According to an embodiment, the conduit unit comprises a composite material and a dielectric component of the thermoelectric generator is arranged between two plies of the composite material.

For example, the wall of the conduit unit is made of a fiber reinforced plastics such as carbon fiber reinforced plastics (CFRP). Such a composite structure usually comprises a plurality of plies, each ply having a specified fiber direction.

The thermoelectric generator includes the dielectric component as part of the basic functional structure of the thermoelectric generator. That is, the conduit unit, e.g., the tube, which may be made of the composite material can be modified to obtain enhanced mechanical and thermoelectric properties. The dielectric component may be a glass fiber layer (lamina) or substrate which is arranged between two plies of the composite material. This dielectric layer may be integrated into the wall of the conduit unit via a printing process during the manufacturing of the wall. The design and integration of a system glass fiber lamina with a fully printed thermoelectric generator device represents an exemplary configuration for providing the voltage and electrical current output upon exposure to the temperature gradient.

Some of the fibers in the composite material of the conduit unit can be used to serve as sensors of the monitoring unit, e.g., as electrical resistors. In an example, the fibers can act as crack sensors. Alternatively, miniaturized sensors can be integrated in or on the wall of the conduit unit.

According to an embodiment, the composite material comprises carbon fiber reinforced plastics.

The conductive material of the carbon fiber reinforced plastics can be used as electrodes for the thermoelectric generator. The carbon fiber reinforced material may represent the wall of the conduit unit. The dielectric component of the thermoelectric generator can be placed in the wall of the conduit unit during the manufacturing of the wall when the plies of the carbon fiber reinforced material are stacked one upon the other.

According to an embodiment, the at least one thermoelectric generator includes a plurality of thermoelements electrically connected in a serial or a parallel arrangement.

Besides the dielectric component, the thermoelements may be another functional part of the thermoelectric generator. The thermoelements may be placed on one or both sides of the dielectric component. For example, a double-sided deposition of an inorganic-organic hybrid p-type thermoelement paste can be applied onto a dielectric fibrous substrate, e.g., the above-mentioned glass fiber layer, which may be integrated into the composite material of the wall of the conduit unit. This configuration can operate as a high-power density structural single-thermoelement through-thickness thermoelectric generator. The device efficiency will improve when using multiple in-series and/or in-parallel interconnected thermoelements to drastically increase the total thermoelement voltage and power output.

In general, a plurality of thermoelements can be electrically connected in a serial or a parallel arrangement anywhere in or on the wall of the conduit unit. In an example, the thermoelements can be electrically connected in a serial arrangement on the dielectric component which is arranged between two plies of the composite material of the wall.

According to an embodiment, the at least one thermoelectric generator includes a dielectric layer, e.g., a glass fiber layer or glass fiber lamina, which is integrated into the wall of the conduit unit.

This means that the dielectric layer which may be a functional part of the thermoelectric generator is placed inside the wall or on a surface of the wall of the conduit unit. Various design options are possible. For example, several thermoelements of the thermoelectric generator may be attached at the dielectric layer and such a designed dielectric layer can be positioned on the outer surface of the wall or inside the wall, for example between respective plies of the composite material of the wall. It is possible that the dielectric layer, on which the thermoelements are positioned, can be arranged in an alternating sequence with the plies of the composite material, thereby providing a parallel connection of thermoelements.

According to an embodiment, at least one thermoelement is placed on each side of the dielectric layer of the thermoelectric generator.

For example, one or more thermoelements of the thermoelectric generator may be attached at both sides the dielectric layer. As indicated above, an inorganic-organic hybrid p-type thermoelement paste can be applied onto the dielectric layer which is integrated into the composite material of the wall of the conduit unit.

According to an embodiment, the at least one thermoelectric generator comprises printed electronics being integrated into the wall of the conduit unit. Alternatively, the at least one thermoelectric generator comprises hybrid integrated electronics being integrated into the wall of the conduit unit.

For example, the thermoelectric generator device can be fabricated on a thin foil, e.g., polyimide, which allows simple interconnections in the form of printed electronics. The printed electronics can be integrated into the wall during the manufacturing thereof.

According to an embodiment, the at least one thermoelectric generator is provided in the form of a flexible structure which is configured to adapt to the shape of the wall of the conduit unit.

The flexible structure may include a foil or sheet-like material or substrate to which the thermoelements of the thermoelectric generator are attached. In this manner, the thermoelectric generator can adapt any geometrical shape of the wall structure of the conduit unit. For example, if the conduit unit is present in the form of a tube, the thermoelectric generator, in particular the different functional parts thereof, can be deformed such that it conforms the shape of the tube.

According to an embodiment, the wall of the conduit unit has a first wall portion providing a direct contact surface with a first part of the at least one thermoelectric generator. Furthermore, the wall of the conduit unit also has a second wall portion which is connected to the least one thermoelectric generator via an insulation layer which spatially separates the second wall portion from a second part of the at least one thermoelectric generator.

The first part of the thermoelectric generator which directly contacts the first wall portion may have a higher temperature than the second part of the thermoelectric generator since the second part is thermally isolated from the wall by the insulation layer. This temperature difference over the different parts of the thermoelectric generator will enable electric energy generation as explained herein. The specific arrangement of such an embodiment will be described with reference to the Figures in more detail.

According to an embodiment, the monitoring unit is configured to monitor the state or condition of the conduit unit by at least one of detecting a leakage occurrence at the conduit unit, determining a temperature at the conduit unit, determining a pressure at the conduit unit, determining a flow rate of the fluid at the inside of the conduit unit and determining a pH-value of the fluid inside the conduit unit.

The monitoring function can be used to monitor the structural integrity of the conduit unit, i.e., the so-called structural health monitoring (SHM). Further options include, but are not limited to, sensing the temperature, pressure, flow rate, pH-value of the fluid.

For example, in the bleed air distribution system, leaks in the conduit unit and in the intersections can be detected by the monitoring unit. This may be important due to a possibly high temperature of the air. Therefore, leakage monitoring is required, e.g., through distributed temperature monitoring to identify hot air escaping form the conduit unit.

The conduit unit of the inventive device already contains the required energy supply, sensors and electronics including an optional wireless data transfer. In addition, the thermoelectric generator functionality can even be included already during the manufacturing of the conduit unit.

The inventive device can be employed where thermal energy can be leveraged during system operation, i.e., where temperature gradients exist, for example in aerospace, automotive, aeronautics and renewable energy fields. The device provides a self-powered recording of the exposure history of their components/structures to thermal fields and eliminates the need for external sensors since only the existing functional reinforcing phases can perform this task.

According to an aspect, a fluid distribution system is provided which comprises the fluid transport device as described herein. The fluid distribution system may be part of an aircraft gas distribution system like for instance an aircraft bleed air distribution system.

According to another aspect, a method for manufacturing a fluid transport device is provided. A step of the method includes manufacturing a conduit unit having a wall for separating an inside of the conduit unit from an outside of the conduit unit, wherein the conduit unit is configured to transport a fluid through the inside of the conduit unit. Another step of the method includes integrating an energy supply unit at least partly into the conduit unit during manufacturing of the conduit unit, wherein the energy supply unit is configured to provide electrical energy based on a temperature gradient between the inside of the conduit unit and the outside of the conduit unit. Another step of the method includes coupling a monitoring unit to the conduit unit such that the energy supply unit supplies the monitoring unit with the electrical energy, wherein the monitoring unit is configured to monitor a state or condition of the conduit unit and to generate data representative for the state or condition of the conduit unit.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
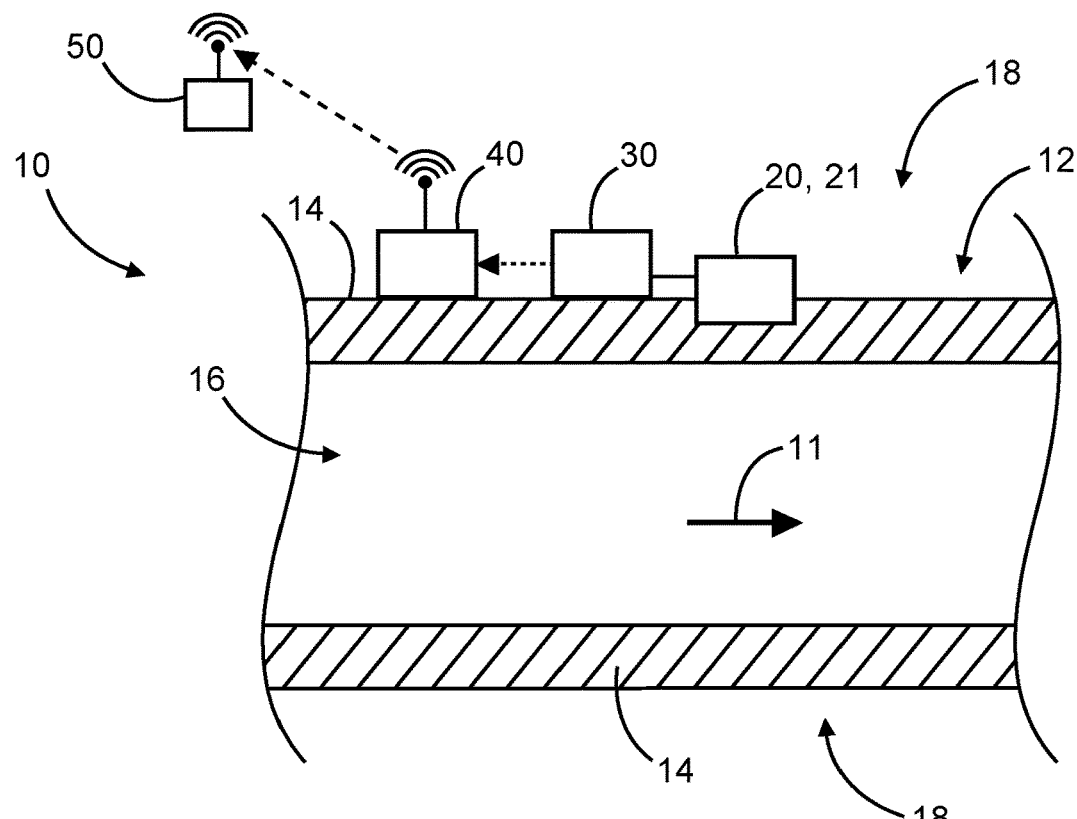
FIG. 1 shows a fluid transport device according to an exemplary embodiment.

The representations and illustrations in the drawings are schematic and not to scale. A better understanding of the method and system described above may be obtained through a review of the illustrations accompanying this application together with a review of the detailed description that follows.

FIG. 1 shows a fluid transport device 10. The fluid transport device 10 comprises a conduit unit 12 having a wall 14 for separating an inside 16 of the conduit unit 12 from an outside 18 of the conduit unit 12. The conduit unit 12 is configured to transport a fluid through the inside 16 of the conduit unit 12. The flow direction of the fluid flow 11 is indicated by an arrow in FIG. 1.

The fluid transport device 10 further comprises an energy supply unit 20, for example a thermoelectric generator 21, which is coupled to the conduit unit 12. The energy supply 20 unit is configured to generate electrical energy based on a temperature gradient between the inside 16 of the conduit unit 12 and the outside 18 of the conduit unit 12. The temperature gradient establishes over the wall 14 due to a temperature difference between the fluid that flows inside the conduit unit 12 and a medium present at the outside 18 of the conduit unit 12. For example, the temperature of the fluid on the inside 16 of the conduit unit 12 may be greater than the temperature on the outside 18 of the conduit unit 12. This temperature gradient can be leveraged by the thermoelectric generator 21 to provide the electrical energy.

The fluid transport device further comprises a monitoring unit 30 configured to monitor a state of the conduit unit 12, wherein the monitoring unit 30 is configured to generate data representative for the state of the conduit unit 12. The energy supply 20 unit is configured to supply the generated electrical energy to the monitoring unit 30, thereby enabling the monitoring unit 30 to monitor the state of the conduit unit 12. In other words, operation of the monitoring unit 30 is ensured by the electrical energy provided by the energy supply unit 20.

As can also be derived from FIG. 1, a data transmission unit 40 may also be coupled to the conduit unit 12. The data transmission unit 40 may be communicatively coupled to the monitoring unit 30 in order to receive data obtained by the monitoring unit 30 and transmit these data to an external device 50. The data transmission between the data transmission unit 40 and the external device 50 may be conducted via a wired or wireless transmission.

It is noted that FIG. 1 is a schematic representation of the different components of the fluid transport device 10 and that the arrangement and integration of these components within the fluid transport device 10 can be modified as described herein.

Figure 2:
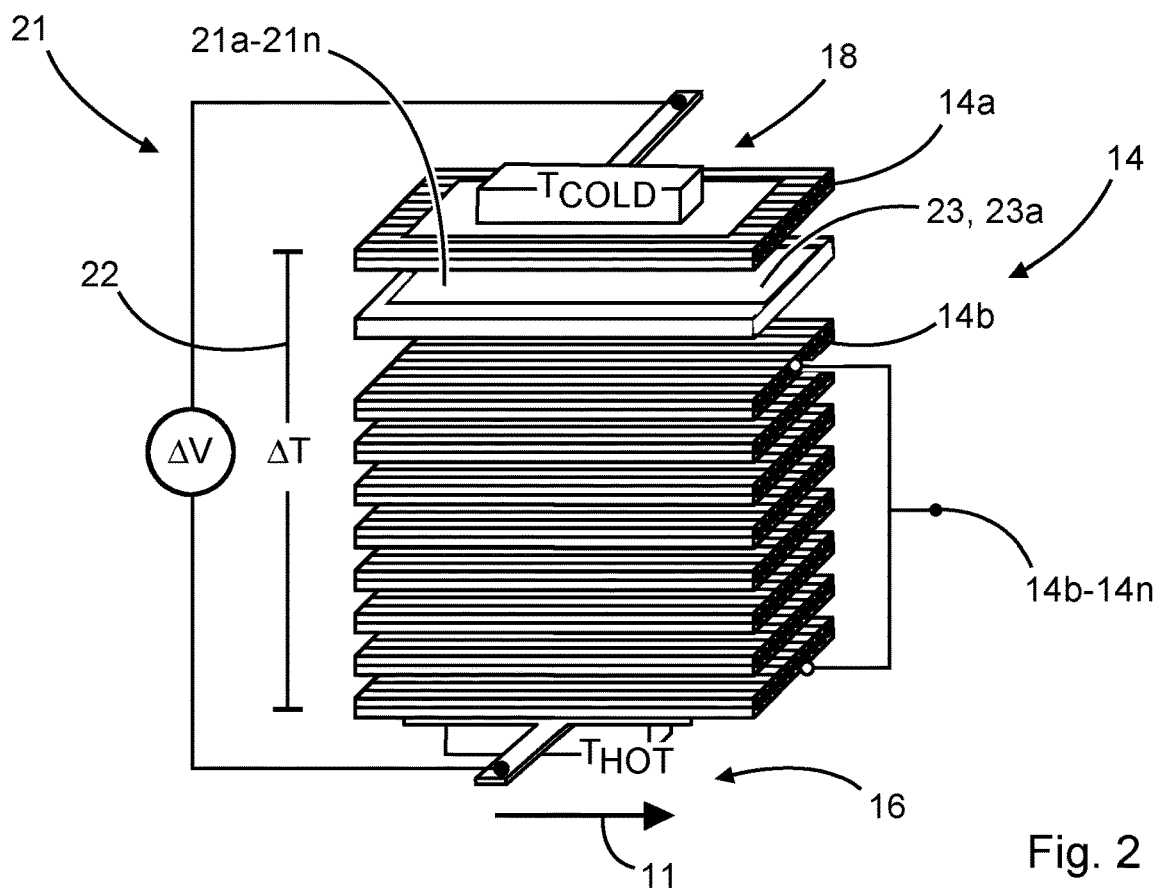
FIG. 2 shows a wall portion of a conduit unit of a fluid transport device having a thermoelectric generator according to an exemplary embodiment.

FIG. 2 shows a wall 14, in particular a wall portion 14, of a conduit unit of a fluid transport device, for example the conduit unit 12 of the fluid transport device 10 of FIG. 1 described above. The wall portion 14 is made of a composite material, in particular carbon fiber reinforced plastics having a plurality of plies 14a to 14n being arranged in a stacked manner as shown in FIG. 2. The wall portion 14 separates an inside 16 of the conduit unit 12 from an outside 18 of the conduit unit 12. The composite material may be an electrically conductive material.

A thermoelectric generator 21 is integrated into the wall portion 14 of the conduit unit 12. The thermoelectric generator comprises a dielectric component 23, e.g., a dielectric layer 23a, which is a functional part of the thermoelectric generator 21. The dielectric component 23 may have a flat structure, for example a foil-like or sheet-like structure. The dielectric component 23 is arranged between a first ply 14a and a second ply 14b of the composite material. The first ply 14a may act as a first electrode and the remaining plies 14b to 14n may act as a second electrode of the thermoelectric generator 21. Both electrodes also form functional parts of the thermoelectric generator 21.

As indicated with DT in FIG. 2, a temperature gradient or difference 22 between the inside 16 of the conduit unit 12 and the outside 18 of the conduit unit 12 is established by the different temperatures of the fluids inside and outside the conduit unit 12. In this example, the temperature on the inside 16 of the conduit unit 12, which may occur as a result of the fluid flow 11 through the conduit unit 12, is higher than the temperature on the outside 18 of the conduit unit 12.

The thermoelectric generator 21 includes one or more thermoelements 21a to 21n which also represent functional parts of the thermoelectric generator 21. The one or more thermoelements 21a to 21n may be attached, e.g., printed, on the dielectric component 23. The thermoelements 21a to 21n may be electrically connected in parallel or in series. In the example shown in FIG. 2, only one dielectric component 23 is arranged within the wall portion 14. However, it is understood that multiple dielectric components 23 having thermoelements 21a to 21n attached thereon can be arranged in the wall portion 14. For example, a further dielectric component 23 with thermoelements 21a to 21n can be arranged between the first ply 14a and the second ply 14b or between two of the remaining plies 14b to 14n of the stack.

The thermoelectric generator generates a voltage, i.e., electrical energy, which is indicated with DV in FIG. 2. A copper foil may be arranged on each side of the wall portion 14 which act as connection points of the electrodes for the respective voltage levels. The generated electrical energy from the thermoelectric generator 23 can then be used by the monitoring unit 30 and/or the data transmission unit 40 (cf. FIG. 1) for their operation.

The fluid transport device 10 can be manufactured by using an impregnation of carbon fiber reinforcement to obtain the structural part of the wall portion 14 of the conduit unit 12, wherein parts of the fiber reinforced wall portion 14 act as the thermoelectric generator 21.

An exemplary realization of the thermoelectric generator 21 includes a double-sided deposition of an inorganic-organic hybrid p-type thermoelement paste onto the dielectric component 23, e.g., a fibrous substrate in the form of a glass fiber lamina, which is integrated into the fiber reinforced wall portion 14, and thus forms a structural single-thermoelement through-thickness thermoelectric generator 21. As noted above, highly conductive carbon fibers may be used which provide the reinforcement of the wall portion 14 and also serve as the internal junctions, i.e., electrodes, of the thermoelectric generator 21. As should be understood, the efficiency of the thermoelectric generator 21 can be further improved by using multiple in-series and/or in-parallel interconnected thermoelements, thereby increasing the total thermoelement voltage and power output.

In an alternative example, the thermoelectric generator 21 can be fabricated on a thin foil, e.g., polyimide, which allows simple interconnections, for example using printed electronics.

Figure 3:
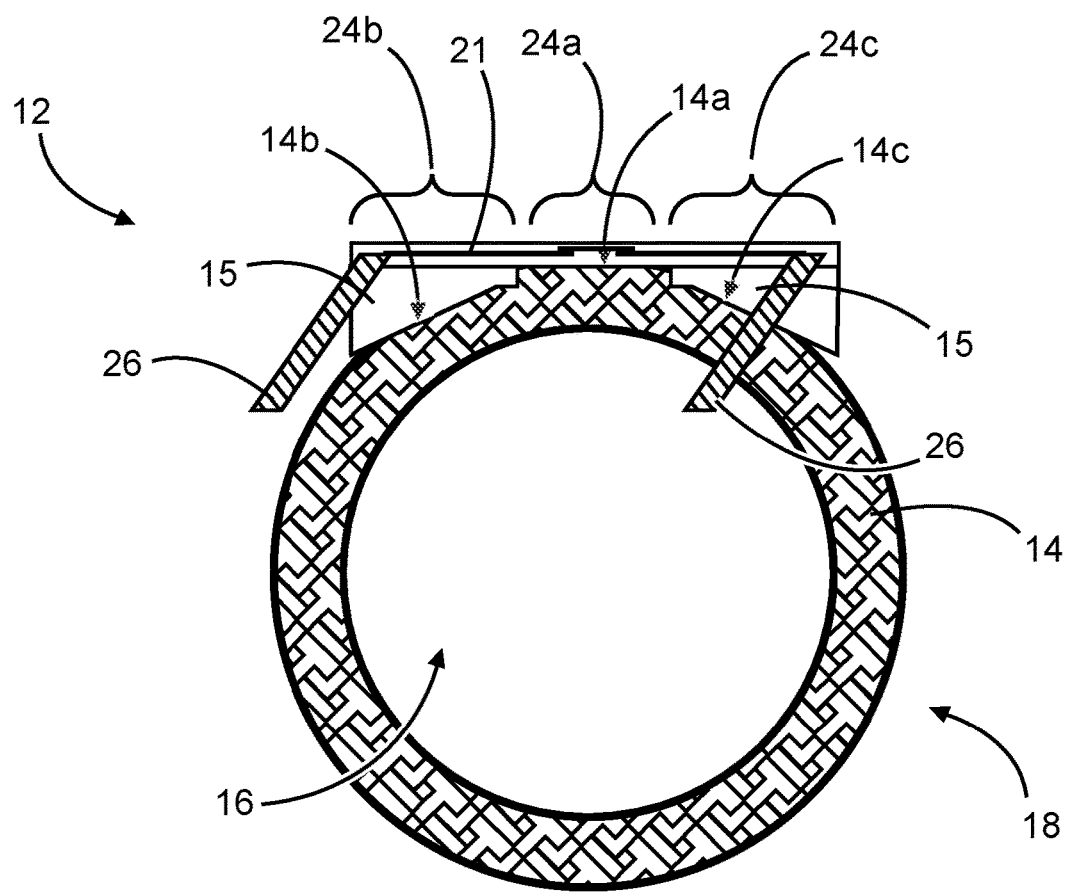
FIG. 3 shows a cross-sectional view of a wall of a conduit unit of a fluid transport device having a thermoelectric generator according to an exemplary embodiment.

FIG. 3 shows a cross-sectional view of a wall 14 of a conduit unit 12 of a fluid transport device, for example the fluid transport device 10 as described with reference to FIG. 1 above. The inside 16 of the conduit unit 12 provides a passage for a fluid and is separated from the outside 18 of the conduit unit 12 by the wall 14. The wall 14 is present in the form of a tube, preferably made of CFRP, and includes a thermoelectric generator 21 which is located, e.g., attached, on the outside 18 of the conduit unit. The wall 14 of the conduit unit 12 has a first wall portion 14a providing a direct contact surface with a first part 24a of the thermoelectric generator 21. The wall 14 of the conduit unit 12 further has a second wall portion 14b which is connected to the least one thermoelectric generator 21 via an insulation layer 15 which spatially separates the second wall portion 14b from a second part 24b of the at least one thermoelectric generator 21.

In particular, the insulation layer 15 thermally isolates the second part 24b and a third part 24c of the thermoelectrical generator 21 from corresponding second and third wall portions 14b, 14c, whereas the direct contact between the first wall portion 14a and the first part 24a of the thermoelectric generator 21 enables an enhanced heat flux via the contact surface between the first wall portion 14a and the first part 24a of the thermoelectric generator 21. In consequence, if the temperature of the fluid on the inside 16 of the conduit unit 12 is greater than the temperature of the fluid on the outside 18 of the conduit unit 12, then the first part 24a of the thermoelectric generator 21 which directly contacts the first wall portion 14a may have a higher temperature than the second and third parts 24b, 24c of the thermoelectric generator 21 since the second and third parts 24b, 24c are thermally isolated from the wall 14 by the insulation layer 15. This temperature difference over the different parts of the thermoelectric generator 21 enables electric energy generation as explained above. Electrical connections may be provided in the form of the electrodes 26, for example tapes made of silver, which are coupled to the thermoelements 21a to 21n which will be described with reference to FIG. 4.

Figure 4:
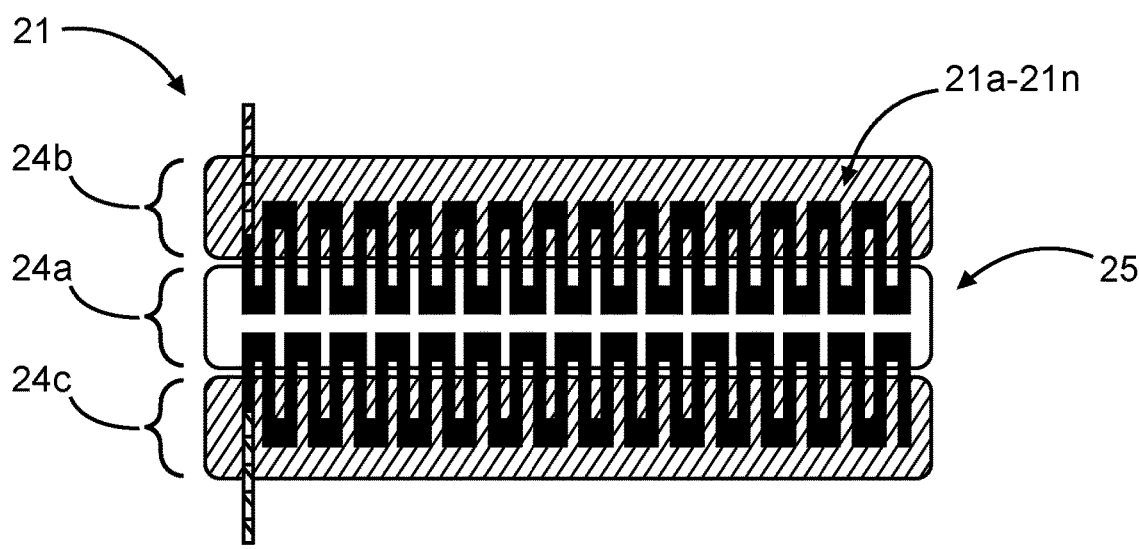
FIG. 4 shows an arrangement of thermoelements of a thermoelectric generator according to an exemplary embodiment.

FIG. 4 shows a top view onto the thermoelectric generator 21 of FIG. 3. In particular, FIG. 4 shows an arrangement of thermoelements 21a to 21n of said thermoelectric generator 21. As can be seen, thermoelements 21a to 21n extend over the three parts 24a, 24b and 24c of the thermoelectric generator 21. The thermoelements 21a to 21n comprise a meandric shape. It is noted that the first part 24a of the thermoelectric generator 21 represents the part which directly contacts the first wall portion 14a of the conduit unit 12, whereas the second and third parts 24b, 24c of the thermoelectric generator 21 represent the parts which are isolated from the corresponding second and third wall portions 14b, 14c of the conduit unit 12 (cf. FIG. 3).

The thermoelectric generator 21 may be present in the form of a flexible structure 25 which is configured to adapt to the shape of the wall 14 of the conduit unit 12. Accordingly, the thermoelectric generator 21 of FIGS. 3 and 4 can be shaped in an arbitrary manner. The flat structure of the thermoelectric generator 21 as shown in these Figures is merely an example. In particular, the thermoelectric generator 21 may be at least partially wrapped around the wall 14 and/or the insulation layer 15 of the conduit unit 12. For example, a flexible lamina-printed thermoelectric generator 21 is wrapped and bonded with the appropriate tooling around the CFRP tube 12. P- and n-type aqueous thermoelement inks or pristine single walled carbon nano tube (SWCNT) powder can be employed to manufacture the thermoelectric generator 21. A glass fiber reinforcement layer (dielectric component) can be selectively printed via ink dispersion processes within an in-plane p-n thermoelectric generator area using a predetermined pattern. The resulting optimal multiple p-type and n-type printed films exhibit efficient thermoelement values and, in addition, a good stability in air, when operating at temperatures up to 140° C.

The printed flexible structure 25 of the thermoelectric generator 21 can be impregnated with epoxy resin during the manufacturing of the CFRP tube. In particular, additional individual glass fiber layers 23 for the thermoelectric generator 21 can be pre-impregnated with epoxy resin and integrated into the tube 12 to create the temperature gradient 22 between the inside 16 and the outside 18 of the composite tube 12. Afterwards, the composite tube 12 which incorporates the thermoelectric generator 21 can be prepared with a molding tool that is employed for the polymerization process.

An automated and continuous 2D printing of solution-processed functional inks onto the glass fiber reinforcing layers 23 may enable the realization of a functional prepreg system for laminae-devices, which can be directly utilized within a multifunctional CFRP part manufacturing procedure.

A fully printed thermoelectric generator 21, which may be used in the inventive fluid transport device 10, may comprise multiple serially interconnected p- and n-type thermoelement films which may be configured for power generation up to an open-circuit voltage of about 1 V, short-circuit current of about 1 mA and a power output of greater than 200 µW at a certain temperature gradient of 100 K.

As a further example, an epoxy resin matrix nanomodification (e.g., CNT-based fillers) may be employed for an enhancement of fracture toughness of the CFRP parts of the tube 12 and an improvement of their through-thickness thermal conductivity. This structure enhancement may compensate for any additional mass due to the integration of the glass fiber spatial insulating layers 23.

Figure 5:
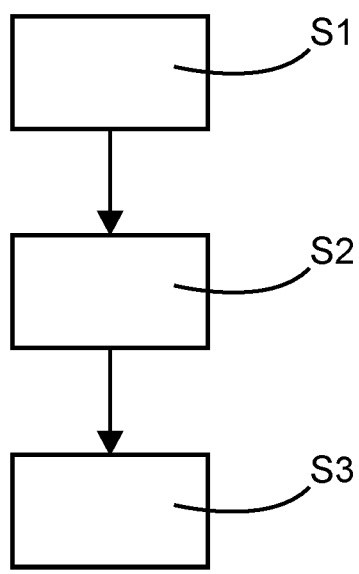
FIG. 5 shows a flow diagram of a method for manufacturing a fluid transport device according to an exemplary embodiment.

FIG. 5 shows a flow diagram of a method for manufacturing a fluid transport device, for example the fluid transport device 10 of FIG. 1 described above. A step S1 of the method comprises manufacturing of a conduit unit 12 having a wall 14 for separating an inside 16 of the conduit unit 12 from an outside 18 of the conduit unit 12, wherein the conduit unit 12 is configured to transport a fluid through the inside 16 of the conduit unit 12. Another step S2 of the method comprises integrating an energy supply unit 20 at least partly into the conduit unit 12 during manufacturing of the conduit unit 12, wherein the energy supply unit 20 is configured to provide electrical energy based on a temperature gradient 22 between the inside 16 of the conduit unit 12 and the outside 18 of the conduit unit 12. Another step S3 of the method comprises coupling a monitoring unit 30 to the conduit unit 12 such that the energy supply unit 20 supplies the monitoring unit 30 with the electrical energy, wherein the monitoring unit 30 is configured to monitor a state of the conduit unit 12 and to generate data representative for the state of the conduit unit 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fluid transport device comprising:
a conduit unit having a wall for separating an inside of the conduit unit from an outside of the conduit unit, wherein the conduit unit is configured to transport a fluid through the inside of the conduit unit;
an energy supply unit coupled to the conduit unit, wherein the energy supply unit is configured to provide electrical energy based on a temperature gradient between the inside of the conduit unit and the outside of the conduit unit; and
a monitoring unit configured to monitor a state of the conduit unit, wherein the monitoring unit is configured to generate data representative of the state of the conduit unit;
wherein the energy supply unit is configured to supply the electrical energy to the monitoring unit, thereby enabling the monitoring unit to monitor the state of the conduit unit,
wherein the energy supply unit comprises at least one thermoelectric generator at least partially integrated into the wall of the conduit unit, and
wherein the conduit unit comprises a composite material and wherein a dielectric component of the thermoelectric generator is arranged between two plies of the composite material.

2. The fluid transport device of claim 1, further comprising:
a data transmission unit configured to transmit the data generated by the monitoring unit to an external device.

3. The fluid transport device according to claim 1,
wherein the monitoring unit configured to monitor the state of the conduit unit by at least one of detecting a leakage occurrence at the conduit unit, determining a temperature at the conduit unit, determining a pressure at the conduit unit, determining a flow rate at the inside of the conduit unit or determining a pH-value of the fluid.

4. The fluid transport device according to claim 1,
wherein the composite material comprises carbon fiber reinforced plastics.

5. The fluid transport device according to claim 1,
wherein the at least one thermoelectric generator is configured to generate the electrical energy based on the temperature gradient between the inside of the conduit unit and the outside of the conduit unit.

6. The fluid transport device according to claim 5,
wherein the at least one thermoelectric generator includes a plurality of thermoelements electrically connected in a serial or a parallel arrangement.

7. The fluid transport device according to claim 5,
wherein the at least one thermoelectric generator includes a dielectric layer integrated into the wall of the conduit unit.

8. The fluid transport device according to claim 7,
wherein at least one thermoelement is placed on each side of the dielectric layer of the thermoelectric generator.

9. The fluid transport device according to claim 5,
wherein the at least one thermoelectric generator comprises printed electronics integrated into the wall of the conduit unit; or
wherein the at least one thermoelectric generator comprises hybrid integrated electronics integrated into the wall of the conduit unit.

10. A fluid distribution system comprising a fluid transport device according to claim 1.

11. A method for manufacturing a fluid transport device, comprising:
manufacturing a conduit unit having a wall for separating an inside of the conduit unit from an outside of the conduit unit, wherein the conduit unit is configured to transport a fluid through the inside of the conduit unit;
integrating an energy supply unit at least partly into the conduit unit during manufacturing of the conduit unit, wherein the energy supply unit is configured to provide electrical energy based on a temperature gradient between the inside of the conduit unit and the outside of the conduit unit, wherein the energy supply unit comprises at least one thermoelectric generator at least partially integrated into the wall of the conduit unit, and wherein the conduit unit comprises a composite material and wherein a dielectric component of the thermoelectric generator is arranged between two plies of the composite material; and
coupling a monitoring unit to the conduit unit such that the energy supply unit supplies the monitoring unit with the electrical energy, wherein the monitoring unit is configured to monitor a state of the conduit unit and to generate data representative of the state of the conduit unit.

12. A fluid transport device comprising:
a conduit unit having a wall for separating an inside of the conduit unit from an outside of the conduit unit, wherein the conduit unit is configured to transport a fluid through the inside of the conduit unit;
an energy supply unit coupled to the conduit unit, wherein the energy supply unit is configured to provide electrical energy based on a temperature gradient between the inside of the conduit unit and the outside of the conduit unit; and
a monitoring unit configured to monitor a state of the conduit unit, wherein the monitoring unit is configured to generate data representative of the state of the conduit unit;
wherein the energy supply unit is configured to supply the electrical energy to the monitoring unit, thereby enabling the monitoring unit to monitor the state of the conduit unit,
wherein the energy supply unit comprises at least one thermoelectric generator at least partially integrated into the wall of the conduit unit,
wherein the wall of the conduit unit has a first wall portion providing a direct contact surface with a first part of the at least one thermoelectric generator; and
wherein the wall of the conduit unit has a second wall portion connected to the least one thermoelectric generator via an insulation layer spatially separating the second wall portion from a second part of the at least one thermoelectric generator.

* * * * *